United States Patent
Gonion

(10) Patent No.: US 8,949,808 B2
(45) Date of Patent: Feb. 3, 2015

(54) SYSTEMS AND METHODS FOR COMPILER-BASED FULL-FUNCTION VECTORIZATION

(75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 12/888,658

(22) Filed: Sep. 23, 2010

(65) Prior Publication Data
US 2012/0079466 A1    Mar. 29, 2012

(51) Int. Cl.
*G06F 9/45* (2006.01)

(52) U.S. Cl.
CPC .............. *G06F 8/433* (2013.01); *G06F 8/445* (2013.01); *G06F 8/447* (2013.01)
USPC ........................................ 717/150; 717/149

(58) Field of Classification Search
USPC ....................................................... 717/150
See application file for complete search history.

(56) References Cited

U.S. PATENT DOCUMENTS

| | | | |
|---|---|---|---|
| 4,710,872 A | 12/1987 | Scarborough | |
| 4,833,606 A | 5/1989 | Iwasawa | |
| 5,274,812 A | 12/1993 | Inoue | |
| 6,795,908 B1 | 9/2004 | Lee | |
| 7,447,886 B2 | 11/2008 | Lee | |
| 7,617,496 B2 | 11/2009 | Gonion | |
| 2002/0052856 A1 | 5/2002 | Satoh | |
| 2004/0003381 A1 | 1/2004 | Suzuki | |
| 2005/0273769 A1* | 12/2005 | Eichenberger et al. | 717/136 |
| 2006/0048111 A1* | 3/2006 | Archambault et al. | 717/144 |
| 2006/0176308 A1* | 8/2006 | Karandikar et al. | 345/501 |
| 2007/0294681 A1 | 12/2007 | Tuck et al. | |
| 2009/0106537 A1 | 4/2009 | Colavin | |
| 2009/0138862 A1 | 5/2009 | Tanabe et al. | |
| 2009/0177669 A1 | 7/2009 | Ramarao et al. | |
| 2009/0307656 A1* | 12/2009 | Eichenberger et al. | 717/110 |
| 2009/0307673 A1 | 12/2009 | Eichenberger et al. | |
| 2010/0023926 A1 | 1/2010 | Sugawara et al. | |
| 2010/0042789 A1 | 2/2010 | Gonion | |

(Continued)

FOREIGN PATENT DOCUMENTS

| | | |
|---|---|---|
| EP | 0785506 | 7/1997 |
| JP | H09-198254 | 7/1997 |

(Continued)

OTHER PUBLICATIONS

Burgess, Mark. "C Programming Tutorial." (1987).*

(Continued)

*Primary Examiner* — Chameli Das
*Assistant Examiner* — Joanne Macasiano
(74) *Attorney, Agent, or Firm* — Anthony M. Petro; Meyertons, Hood, Kivlin, Kowert & Goetzel, P.C.

(57) ABSTRACT

Systems and methods for the vectorization of software applications are described. In some embodiments, a compiler may automatically generate both scalar and vector versions of a function from a single source code description. A vector interface may be exposed in a persistent dependency database that is associated with the function. This may allow a compiler to make vector function calls from within vectorized loops, rather than making multiple serialized scalar function calls from within a vectorized loop. This may in turn facilitate the vectorization of hierarchical code, which may improve application performance when vector execution resources are available.

21 Claims, 6 Drawing Sheets

(56) References Cited

U.S. PATENT DOCUMENTS

| 2010/0131478 | A1 | 5/2010 | Bauchot |
| 2010/0281471 | A1 | 11/2010 | Liao et al. |
| 2011/0314256 | A1 | 12/2011 | Callahan, II et al. |
| 2012/0180030 | A1 | 7/2012 | Crutchfield et al. |

FOREIGN PATENT DOCUMENTS

| JP | 2004246776 | 9/2004 |
| JP | 2009-129179 | 6/2009 |
| WO | 9013081 | 11/1990 |

OTHER PUBLICATIONS

"compile." http://ieeexplore.ieee.org/stamp/stamp.jsp?tp=&arnumber=4116791. ieeexplore, 2000. Web. May 20, 2013.*

Kral, Stefan, et al. "SIMD vectorization of straight line FFT code." Euro-Par 2003 Parallel Processing. Springer Berlin Heidelberg, 2003. 251-260.*

Lin, Yuan, et al. "Soda: A low-power architecture for software radio." ACM SIGARCH Computer Architecture News. vol. 34. No. 2. IEEE Computer Society, 2006.*

U.S. Appl. No. 12/888,644 entitled "Systems and Methods for Compiler-Based Vectorization of Non-Leaf Code" filed Sep. 23, 2010.

Chen et al., "Ripples: Tool for Change in Legacy Software,"Proceedings IEEE International Conference on Software Maintenance—ICSM-2001, Nov. 7-9, 2001, pp. 230-239.

Nong et al., "A Parallelizing Translator for Object-Oriented Large-Grain Data Flow Model," Proceedings of the Twenty-Eighth Southeastern Symposium on System Theory, Mar. 31-Apr. 2, 1996, pp. 431-435.

Notice of Preliminary Rejection in Korean Application No. 10-2013-7010386 mailed Jul. 29, 2014, 5 pages.

Patent Examination Report No. 1 in Australian Application No. 2011305837 mailed Apr. 29, 2014, 4 pages.

\* cited by examiner

SYSTEMS AND METHODS FOR COMPILER-BASED FULL-FUNCTION VECTORIZATION

CROSS REFERENCE TO RELATED APPLICATIONS

This disclosure is related to U.S. patent application Ser. No. 12/888,644 entitled "SYSTEMS AND METHODS FOR COMPILER-BASED VECTORIZATION OF NON-LEAF CODE" and filed concurrently herewith, which is hereby incorporated by reference in its entirety.

BACKGROUND OF THE DISCLOSURE

1. Field of the Invention

This disclosure relates to computer systems, and, more particularly, to systems and methods for enabling the universal vectorization of software applications.

2. Description of the Related Art

The typical software development paradigm is well known. A computer programmer writes source code in a high-level programming language (e.g., Basic, C++, etc.). At some point, the programmer uses a compiler to transform the source code into object code. After being transformed into executable code (e.g., after linking or other compile-time or run-time processing), the resulting object code can then be executed by a computer or computing device.

Computers now have multiple processing units and are capable of executing instructions in parallel. To take advantage of this architecture, modern compilers may attempt to "parallelize" or "vectorize" certain software functions so that, instead of having a single processing unit sequentially execute one instruction at a time, multiple processing units can execute instructions simultaneously.

During the compilation process, the compiler analyzes a software function to determine if there are any obstacles to vectorization. One such obstacle, for example, is the presence of a true data dependency. This happens when a present instruction refers to the data obtained through the execution of a preceding instruction. In that case, the latter instruction can only be carried out after the former, and therefore the two instructions cannot be executed in parallel. Another potential obstacle is the presence of a function call. For instance, if a function to be compiled makes a call to an external function, then the compiler may not be able to vectorize the calling function.

SUMMARY

The present disclosure provides systems and methods for enabling the universal vectorization of software applications. To that end, systems and methods disclosed herein provide the expression of dependencies and/or interfaces that extend a compiler's ability to vectorize functions.

In a non-limiting embodiment, a compiler may examine memory and/or data dependencies within a function (a "called function") during its compilation, and express those dependencies in a dependency database, such as, e.g., a dependency file. Once compiled, the called function may become, for example, a library function or the like. At a later point in time, another function (a "calling function") may be created such that it makes a call to the called function. During compilation of the calling function, the compiler may access the dependency file associated with the called function and may identify its dependencies. Based on the called function's dependencies, the compiler can make a decision as to whether to vectorize the calling function.

Additionally or alternatively, the compiler may decide to vectorize only a portion of the calling function. The visibility provided by the use of dependency files may allow the compiler to vectorize a higher percentage of functions than would otherwise be possible.

For example, the implementation of dependency files allows the vectorization of functions that include non-leaf loops—i.e., loops that make calls to external functions for which source code is not visible. Because the vast majority of software functions today include one or more non-leaf loops, these systems and methods can increase the amount of vectorization that can be applied to any application.

In another non-limiting embodiment, a compiler may generate both scalar and vector versions of a function from a single source code description. A scalar version of the function may use a scalar interface as originally specified by the source code. Meanwhile, a vector version of the function may implement a vector interface to the function, accepting vector parameters and generating vector return values.

For instance, the vector interface may be exposed in the dependency file associated with the function. The presence of this alternative vector interface allows the compiler to make vector function calls from within vectorized loops, for example, rather than making multiple serialized scalar function calls from within a vectorized loop.

Various combinations of the technologies disclosed herein also permit the vectorization of functions that do not contain loops, which is contrary to accepted wisdom and yet provides numerous advantages. Particularly, these techniques may increase the amount of overall vectorization in software applications.

Figure 1:
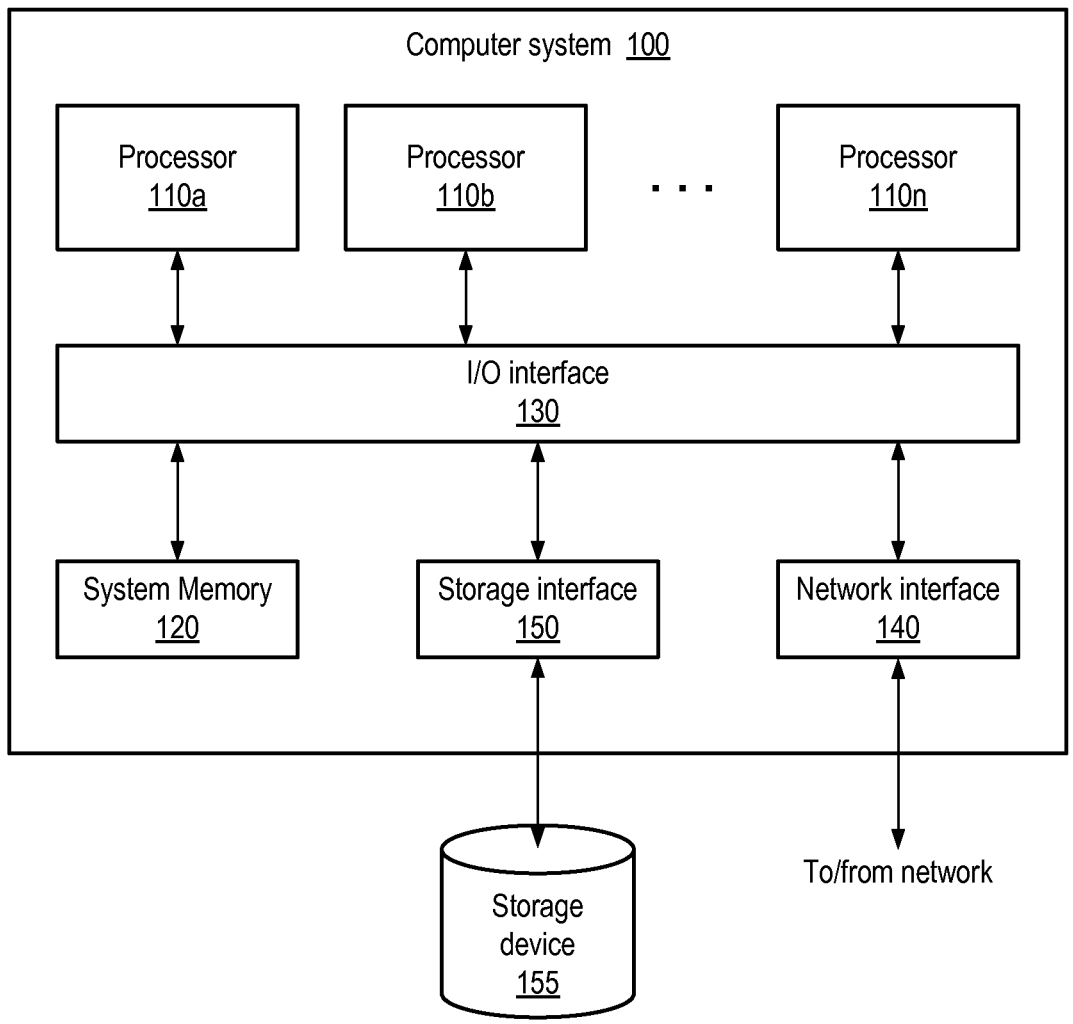
FIG. 1 is a block diagram illustrating a computer system operable to implement techniques for enabling universal vectorization of software applications according to certain embodiments.

While being susceptible to various modifications and alternative forms, specific embodiments discussed in this specification are shown by way of example in the drawings and will herein be described in detail. It should be understood, however, that the drawings and detailed description are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Introduction

The following specification first discusses an illustrative computer system or device. The specification also describes an illustrative compiler that may be configured to execute and/or generate executable code for the computer system. Then, the specification presents several techniques for enabling non-leaf loop and full function vectorization.

An Illustrative Computer System

FIG. 1 depicts an illustrative computer system operable to implement techniques for enabling universal vectorization of software applications according to certain embodiments. In this non-limiting example, computer system 100 includes one or more processors 110a-110n coupled to memory 120 via I/O interface 130. Computer system 100 also includes network interface 140 and storage interface 150 coupled to I/O interface 130. Storage interface 150 connects external storage device 155 to I/O interface 130. Further, network interface 140 may connect system 100 to a network (not shown) or to another computer system (not shown).

In some embodiments, computer system 100 may be a single processor system including only one processor 110a. In other embodiments, computer system 100 may include two or more processors 110a-110n. Processors 110a-110n may include any processor capable of executing instructions. For example, processors 110a-110n may be general-purpose or embedded processors implementing any suitable instruction set architectures (ISAs), such as, for example, the x86, PowerPC™, SPARC™, or MIPS™ ISAs. In an embodiment, processors 110a-110n may include various features of the Macroscalar processors described in U.S. Pat. No. 7,617,496 and U.S. Pat. No. 7,395,419.

System memory 120 may be configured to store instructions and data accessible by processors 110a-110n. For example, system memory 120 may be as static random access memory (SRAM), synchronous dynamic RAM (SDRAM), nonvolatile/Flash-type memory, or any other any suitable type of memory technology. A portion of the program instructions and/or data implementing desired functions or applications described in detail below may be shown stored within system memory 120. Additionally or alternatively, a portion of those program instructions and/or data may be stored in storage device 155, in a cache memory within one or more processors 110a-110n, or may arrive from a network via network interface 140.

I/O interface 130 is operable to manage data traffic between processors 110a-110n, system memory 120, and any device in or attached to the system, including network interface 140, storage interface 150 or other peripheral interfaces. For example, I/O interface 130 may convert data or control signals from one component into a format suitable for use by another component. In some embodiments, I/O interface 130 may include support for devices attached through various types of peripheral buses, such as the Peripheral Component Interconnect (PCI) bus or the Universal Serial Bus (USB), for example. Also, in some embodiments some or all of the functionality of I/O interface 130 may be incorporated into processors 110a-110n.

Network interface 140 is configured to allow data to be exchanged between computer system 100 and other devices attached to a network, such as other computer systems, for example. For example, network interface 140 may support communication via wired or wireless general data networks, telecommunications/telephony networks, storage area networks such as Fibre Channel SANs, and the like.

Storage interface 150 is configured to allow computer system 100 to interface with a storage device such as storage device 155. Storage interface 150 may support standard storage interfaces such as one or more suitable versions of the Advanced Technology Attachment Packet Interface (ATAPI) standard (which may also be referred to as Integrated Drive Electronics (IDE)), the Small Computer System Interface (SCSI) standard, the IEEE 1394 "Firewire" standard, the USB standard, or another standard or proprietary interface suitable for interconnecting a mass storage device with computer system 100. For example, storage device 155 may include magnetic, optical or solid state media that may be fixed or removable. Storage device 155 may also correspond to a hard disk drive or drive array, a CD or DVD drive, or a nonvolatile memory (e.g., Flash)-based device.

System memory 120 and storage device 155 represent illustrative embodiments of a computer-accessible or computer-readable storage medium configured to store program instructions and data. In other embodiments, program instructions and/or data may be received, sent or stored upon different types of computer-accessible media. In general, a computer-accessible medium or storage medium may include any type of mass storage media or memory media such as magnetic or optical media. A computer-accessible medium or storage medium may also include any volatile or non-volatile media such as RAM (e.g. SDRAM, DDR SDRAM, RDRAM, SRAM, etc.), ROM, or the like, whether included in computer system 100 as system memory 120 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 140.

Typically, computer system 100 may take the form of a desktop or laptop computer. As will be readily understood in light of this disclosure, however, computer system 100 may be any suitable device capable of executing software. For example, computer system 100 may be a tablet computer, a phone, or the like.

An Illustrative Compiler

Generally speaking, a compiler may correspond to a software application (e.g., one or more modules of computer-executable instructions) that is configured to translate or transform source code, which may be represented in a high-level programming language such as C, C++ or any other suitable programming language, into object code. The language in which the source code is expressed may be referred to as the source code language or simply the source language. Typically, object code may be represented in the form of instructions and data suitable for processing by a target computing architecture, although in some embodiments, additional processing (e.g., linking) may be performed on generated object code to transform object code into machine-executable code. In various embodiments, such additional processing may be performed by a compiler or by separate applications.

Object code may be represented in machine-readable form (e.g., binary form), in human-readable form (e.g., assembly language) that may require additional processing to generate machine-readable code, or in a combination of human- and machine-readable forms. The target architecture for the object code may be the same as the ISA implemented by processors 110a-110n on which the compiler is configured to execute. However, in some instances, a compiler may be configured to generate object code for a different ISA than the ISA on which the compiler executes (a "cross-compiler").

Figure 2:
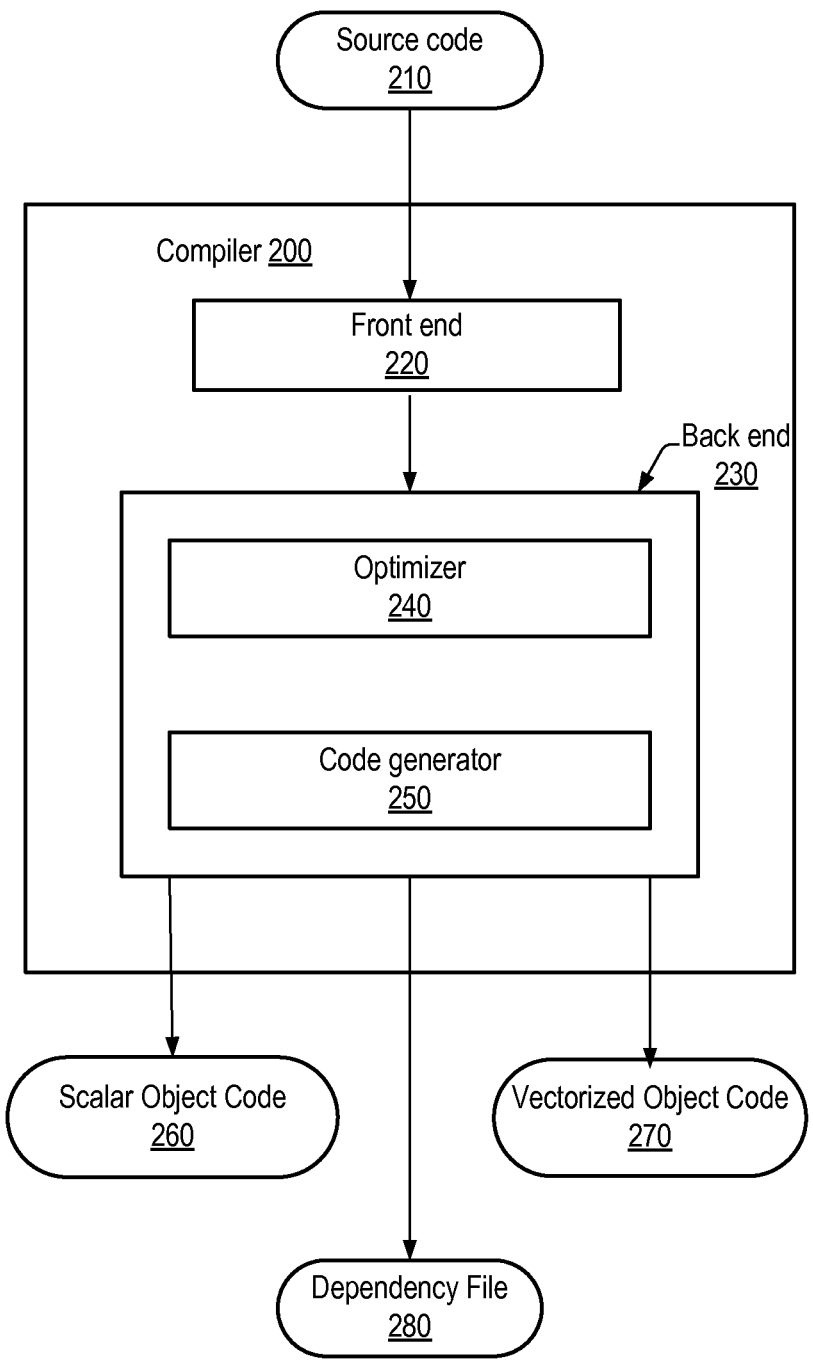
FIG. 2 is a block diagram illustrating a compiler that, when executed by a computer system, may generate executable code according to certain embodiments.

FIG. 2 depicts an illustrative compiler that, when executed by computer system 100 or another suitable computer system, may generate executable code according to certain embodiments. Compiler 200 includes front end 220 and back end 230, which may in turn include optimizer 240 and code generator 250. As shown, front end 220 receives source code 210 and back end 230 produces object code such as, for example, scalar object code 260, vectorized object code 270, or a combination thereof. Compiler 200 may also produce dependency database 280 associated with one or more of object codes 260 and/or 270.

While source code 210 is typically written in a high-level programming language, source code 210 may alternatively correspond to a machine-level language such as assembly language. For example, compiler 200 may be configured to apply its optimization techniques to assembly language code in addition to code written in higher-level programming languages. Also, compiler 200 may include a number of different instances of front end 220, each configured to process source code 210 written in a different respective language and to produce a similar intermediate representation for processing by back end 230. In such embodiments, compiler 200 may effectively function as a multi-language compiler.

In an embodiment, front end 220 may be configured to perform preliminary processing of source code 210 to determine whether the source is lexically and/or syntactically correct, and to perform any transformation suitable to ready source code 210 for further processing by back end 230. For example, front end 220 may be configured to process any compiler directives present within source code 210, such as conditional compilation directives that may result in some portions of source code 210 being included in the compilation process while other portions are excluded. Front end 220 may also be variously configured to convert source code 210 into tokens (e.g., according to whitespace and/or other delimiters defined by the source language), determine whether source code 210 includes any characters or tokens that are disallowed for the source language, and determine whether the resulting stream of tokens obeys the rules of syntax that define well-formed expressions in the source language. In different situations, front end 220 may be configured to perform different combinations of these processing activities, may omit certain actions described above, or may include different actions, depending on the implementation of front end 220 and the source language to which front end 220 is targeted. For example, if a source language does not provide a syntax for defining compiler directives, front end 220 may omit a processing action that includes scanning source code 210 for compiler directives.

If front end 220 encounters errors during processing of source code 210, it may abort processing and report the errors (e.g., by writing error information to a log file or to a display). Otherwise, upon sufficiently analyzing the syntactic and semantic content of source code 210, front end 220 may provide a intermediate representation of source code 210 to back end 230. Generally speaking, this intermediate representation may include one or more data structures that represent the structure and semantic content of source code 210, such as syntax trees, graphs, symbol tables or other suitable data structures. The intermediate representation may be configured to preserve information identifying the syntactic and semantic features of source code 210, and may also include additional annotation information generated through the parsing and analysis of source code 210. For example, the intermediate representation may include control flow graphs that explicitly identify the control relationships among different blocks or segments of source code 210. Such control flow information may be employed by back end 230 to determine, for example, how functional portions of source code 210 may be rearranged (e.g., by optimizer 240) to improve performance while preserving necessary execution-ordering relationships within source code 210.

Back end 230 may generally be configured to transform the intermediate representation into one or more of scalar code 260, vectorized code 270, or a combination of both. Specifically, in the illustrated embodiment, optimizer 240 may be configured to transform the intermediate representation in an attempt to improve some aspect of the resulting scalar code 260 or vectorized code 270. For example, optimizer 240 may be configured to analyze the intermediate representation to identify memory or data dependencies. In some embodiments, optimizer 240 may be configured to perform a variety of other types of code optimization such as vectorization, loop optimization (e.g., loop fusion, loop unrolling, etc.), data flow optimization (e.g., common subexpression elimination, constant folding, etc.), or any other suitable optimization techniques. Optimizer 240 may also be configured to generate dependency database 280. As described in greater detail below, dependency database 280 may express an indication of a memory and/or data dependency within source code 210. Additionally or alternatively, in connection with the vectorization of source code 210, dependency database 280 may expose a vector interface associated with vectorized object code 270.

Code generator 250 may be configured to process the intermediate representation, as transformed by optimizer 206, in order to produce scalar code 260, vectorized code 270, or a combination of both types of code. For example, code generator 250 may be configured to generate vectorized machine instructions defined by the ISA of the target architecture such that execution of the generated instructions by a processor implementing the target architecture (e.g., one of processors 110a-110n, or a different processor) may implement the functional behavior specified by source code 210. In an embodiment, code generator 250 may also be configured to generate instructions corresponding to operations that may not have been inherent in source code 210, but which may have been added by optimizer 240 during the optimization process.

In other embodiments, compiler 200 may be partitioned into more, fewer or different components than those shown. For example, compiler 200 may include a linker (not shown) configured to take one or more object files or libraries as input and combine them to produce a single—usually executable—file. Alternatively, the linker may be an entity separate from compiler 200. As noted above, any of the components of compiler 200, and any of the methods or techniques performed thereby including those described below with respect to FIGS. 3-6, may be implemented partially or entirely as software code stored within a suitable computer-accessible storage medium.

Source code 210 may represent, for example, a software function or algorithm. The resulting object code 260 and/or 270 may be, for example, a library or external function that can be called by other functions. Illustrative techniques employed by compiler 200 during operation, and in particular during its vectorization operation, are discussed in more detail below.

Vectorization of Non-Leaf Loops

Many modern computers have the capability of performing some type of parallel processing of a computational workload by concurrently executing two or more different operations. For example, a superscalar processor may allow a computer to attempt to execute multiple independent instructions at once. Another technique generally referred to as "vector computing" (which may be considered to be a special case of parallel computing) allows a computer to attempt to execute a single instruction that operates on multiple data items at once. Various examples of vector computing can be found in the single instruction, multiple data (SIMD) instruction sets now available in various processors, including, for example, IBM's AltiVec™ and SPE™ instruction set extensions for PowerPC™ processors and Intel's variants of MMX™ and SSE™ instruction set extensions. Such SIMD instructions are examples of vector instructions that may be targeted by a vectorizing compiler, although other types of vector instructions or operations (including variable-length vector operations, predicated vector operations, vector operations that operate on combinations of vectors and scalars/immediates) are also possible and contemplated.

Generally speaking, the process of transforming source code into vectorized object code may be referred to as "vectorization." When performed using a compiler (as opposed to, for example, vectorizing source code by hand), vectorization may be referred to as "compiler auto-vectorization." One particular type of auto-vectorization is loop auto-vectorization. Loop auto-vectorization may convert procedural loops that iterate over multiple data items into code that is capable of concurrently processing multiple data items within separate processing units (e.g., processors $110a$-$110n$ of computer system 100 in FIG. 1, or separate functional units within a processor). For example, to add together two arrays of numbers A[ ] and B[ ], a procedural loop may iterate through the arrays, adding a pair of array elements during each iteration. When compiling such a loop, a vectorizing compiler might take advantage of the fact that the target processor implements vector operations capable of concurrently processing a fixed or variable number of vector elements. For example, the compiler might auto-vectorize the array-addition loop so that at each iteration, multiple elements of arrays A[ ] and B[ ] are concurrently added, reducing the number of iterations needed to complete the addition. A typical program spends a significant amount of its execution time within such loops. As such, auto-vectorization of loops can generate performance improvements without programmer intervention.

In some embodiments, compiler auto-vectorization is limited to leaf loops—i.e., loops that do not make calls to other functions. Vectorization of non-leaf loops—i.e., those that make calls to other functions—is ordinarily very difficult because the side-effects of external functions calls are usually opaque, especially when their source-code is unavailable for inter-procedural analysis, such as is the case with libraries, for example. For purposes of illustration, consider the following loop:

```
for(x=0; x<size; ++x)
{
    A[x]=x;
    foo (x)
}
```

To vectorize this loop, compiler 200 may determine whether function foo( ) interacts with (e.g., reads or writes) array A[ ]. Here, three possibilities exist: (1) function foo( ) does not interact with A[ ]; (2) function foo( ) does interact with A[ ]; or (3) function foo( ) might interact with A[ ] (e.g., depending on a compile-time or run-time condition, foo( ) may or may not interact with A[ ]. The case where function foo( ) might interact with A[ ] presents similar problems as the case where function foo( ) does in fact interact with A[ ]. In the case where there is no interaction between foo( ) and A[ ], then the vectorizable code below is equivalent to the loop above:

```
for (x=0; x<size; ++x)
    A[x] = x;
for (x=0; x<size; ++x)
    foo(x);
```

This example shows that, in the process of vectorizing the non-leaf loop, compiler 200 would benefit from knowing the memory that function accesses and/or whether that memory is read and/or written. Because the majority of loops typically contain function calls within them, the vectorization of non-leaf loops and the functions called by them is preferred for high degrees of vectorization. To enable this level of vectorization, various embodiments of the techniques and systems described herein increase the compile-time visibility of dependencies and potential dependencies across libraries and modules that may have been previously compiled. For example, this information may be available when the calling function is compiled, independently of when (or where) the library or module was originally compiled. Accordingly, certain techniques described herein establish an illustrative compiler infrastructure to create this visibility and explore the types of vectorization enabled by it.

Dependency Databases

When compiling code that calls an external function, it may be desirable to determine the interface of the external function (e.g., the number and/or types of parameters the external function takes, and/or the number and/or types of results it returns). For example, such interface information may be useful in determining whether the calling code has correctly implemented the external function. Externally callable functions may typically expose their interface definitions in header files. However, such header files may not expose the details of variables that are not part of an external function's interface to a calling function, but which may nevertheless affect code vectorization. For example, in the loop illustrated above, vectorization of the for-loop may depend on how function foo( ) interacts with array A[ ]. However, because foo( ) does not take A[ ] as a parameter, the header file corresponding to foo( ) may not adequately indicate this dependency to compiler 200.

A dependency database, which may also be referred to herein as a "persistent dependency database," may describe the dependencies of externally callable functions in a library. That is, a dependency database may expose to a calling function various dependencies of a called function that are not necessarily apparent from the called function's interface alone. This database may be accessed when functions that call a library are compiled. Generally speaking, a dependency database may persistently store indications of the dependencies of callable code such that the dependencies are visible across compiler invocations. For example, in some embodiments, a dependency database may be implemented as a dependency file (analogous to a header file) that includes human-readable and/or machine-readable content indicative of various dependencies. In other embodiments, a dependency database may be implemented using other techniques, such as by using a table-based relational database, semi-structured data (e.g., formatted using Extensible Markup Language (XML)), or any other suitable technique. For simplicity of exposition, the following discussion makes reference to an embodiment that employs a dependency file. However, it should be noted that this is merely an non-limiting example of a dependency database.

In an embodiment, compiler 200 automatically accesses a dependency file (if it exists) upon inclusion of a corresponding header file (e.g., stdlib.h). This mechanism may allow vectorizing compilers such as, for example, Macroscalar compilers to compile existing code without modification while having the advantage of knowing the dependencies of external libraries. Compiler 200 may then generate dependency files automatically when libraries are compiled.

Information contained in a dependency file may form an Application Compiler Interface (ACI) that provides information which compiler 200 can use to understand the constraints of a function. Specifically, dependency files may express information about variables that are not normally within the scope of a calling function. For example, the variables expressed in a dependency file may include data items that are not parameters of the called function (that is, such variables may not be defined by a called function's programming interface as parameters of the called function). Through the use of dependency files, a calling function may become aware of whether a called function reads or writes function-static or file-static variables, for example. Dependency files may also allow compiler 200 to differentiate between variables that share the same name but have different scopes.

As a non-limiting example, when a library stdlib is compiled, a compiler would ordinarily only generate object file stdlib.o. Using the techniques described herein, compiler 200 may also generate dependency file stdlib.d, for example, at compile-time. Dependency file stdlib.d exposes memory dependencies associated with public functions defined in stdlib.h. Other programs that include stdlib.h from their source code may trigger compiler 200 to search for the associated dependency file stdlib.d in corresponding locations. This dependency file may be distributed and installed along with stdlib.h and stdlib.o. In one implementation, the absence of a dependency file would mean that no additional information about the library is available, which might be the default state for legacy libraries and would not cause any compile errors.

Dependency databases may enable vectorization of non-leaf loops by exposing the data dependency characteristics of a previously-compiled library function (or any function in a program) in a manner that is visible to compiler 200 when the code that calls the library function is compiled. This information may be made available without revealing the source-code for the library.

In some embodiments, the dependency information may be generated at compile-time of the library. For example, for each function that is compiled, compiler 200 may note the types of accesses to function static variables, file static variables, global variables, and/or pointers passed in to the function being compiled. Compiler 200 may then record which symbols were read or written, and export this information in the form of a dependency file that can be accessed and used at the compile-time of other code that references the library.

As another non-limiting example, if the function foo( ) is defined in file foo.c and its interface is defined in the header file foo.h, then at the compile time of foo.c, the memory dependency characteristics of function foo( ) may be stored into dependency file foo.hd. (It is noted that any suitable naming convention for dependency files may be employed.) A calling function that uses function foo( ) may include header file foo.h, but may have no access to file foo.c. At the time that foo.h is referenced during compilation of the calling function, compiler 200 may automatically search for the dependency file foo.hd to see whether it exists. Because the existence of dependency file foo.hd is optional, the absence of this file may imply that the dependency characteristics of functions defined in file foo.h are unknown, thus suggesting compiler 200 should make pessimistic assumptions when vectorizing the calling function. If the dependency file exists, however, compiler 200 can use the dependency information in this file to make more accurate and aggressive assumptions using the dependency characteristics contained therein during vectorization of the calling function.

Figure 3:
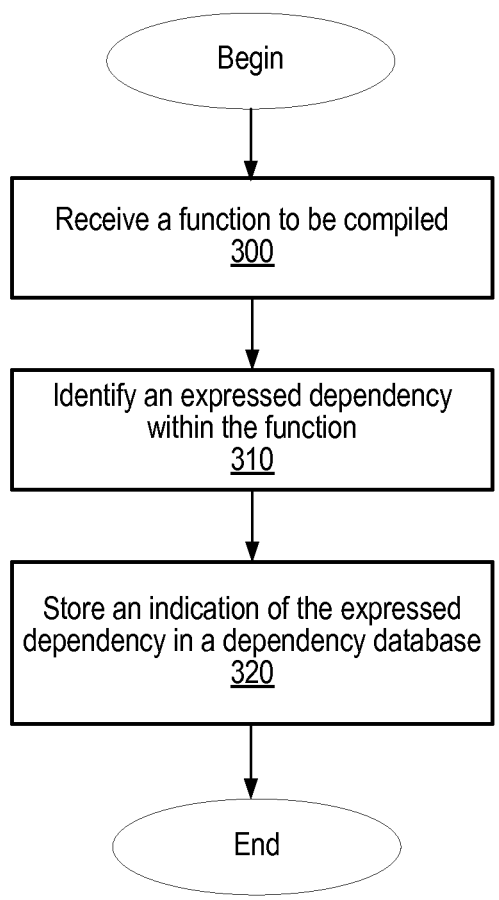
FIG. 3 shows a flow diagram illustrating a method of expressing a dependency in a dependency database according to certain embodiments.

Referring to FIG. 3, a flowchart representing a method of expressing a dependency in a dependency file is depicted according to certain embodiments. In block 300, compiler 200 receives a function to be compiled. For example, compiler 200 may receive the function when processing source code for compilation, such as during compilation of a library that includes the function. In block 310, compiler 200 analyzes the function and identifies an expressed dependency within the function. This expressed dependency may be, for example, a memory or data dependency associated with a data item that is not a parameter of the called function. More generally, an expressed dependency of a function with respect to a particular data item may indicate whether the function only reads the particular data item, only writes the particular data item, or both reads and writes the particular data item. In various embodiments, analysis of the function may include activities such as performing a lexical, syntactic, and/or semantic analysis of the function. Analysis may also include generating a parse tree, symbol table, intermediate-code representation, and/or any other suitable data structure or representation that is indicative of some aspect of the operations and/or data references of the code being compiled.

In block 320, compiler 200 stores an indication of the expressed dependency in a dependency database associated with the function. For example, during analysis of the function, compiler 200 may identify variables used by the function that are not necessarily local or private to that function, and thus are capable of being read or written by code that is external to the function. Such variables may be examples of expressed dependencies that compiler 200 might identify, and compiler 200 may store indications of these variables within a dependency database. (It is noted that in some embodiments, compiler 200 may also identify and indicate dependencies that are local or private to the function.) In various embodiments, the indication of an expressed dependency may include information that identifies the expressed dependency, such as a name of the variable depended upon. The indication may also include information that characterizes the expressed dependency, such as information regarding whether the function reads or writes the variable, and/or information regarding the data type or scope of the variable (e.g., whether the variable is global, private, static, etc.). As will be readily apparent in light of this disclosure, the dependency file may be created or updated in any suitable format such as, for example, Extensible Markup Language (XML), or the like. Moreover, in some embodiments, dependencies may be indicated in a negative fashion instead of or in addition to an affirmative fashion. For example, a dependency file may explicitly indicate that a given variable is not dependent on external code, in addition to or instead of indicating those expressed dependencies that do exist.

For instance, consider the example below, where func1.c is to be compiled:

```
// --- File func1.c ---
int A[1000]; // Global array A
int F[1000]; // Global array F
#include <foo1.h>
int func1(int b)
```

-continued

```
{
int x,c;
c = 0;
for (x=0; x<100; ++x)
{
c = c + foo1(x) + A[x+b] ;
F[x] = c
}
return(c);
}
```

In this case, func1.c makes a call to external function foo1.c, shown below:

```
// --- File foo1.c ---
int foo1(int d)
{
static int e = 0;
e = e + d;
return(e);
}
```

The source code for called function foo1.c is reproduced for illustration purposes only. It is understood that, so long as a dependency database (in this example, a dependency file) exists for foo1.c, its source code need not be available during compilation of calling function func1.c. In this example, the expressed dependency information stored in the dependency file foo1.hd, which may have been generated at the time when file foo1.c is compiled, may express the fact that the function static variable "e" is both read and written. As such, one non-limiting example of a corresponding dependency file is shown below:

```
// --- File foo1.hd ---
function foo1(void)
{
read e;
write e;
}
```

At the compile time of file func1.c, the inclusion of header file foo1.h may cause the dependency file foo1.hd to be read by compiler 200. This information informs the compiler of the expressed dependencies of called function foo1( ): i.e., that static variable "e" is read and written. This also allows compiler 200 to detect that even though they are used in calling function func1( ), global variables "A" and "F" are not referenced by called function foo1( ). This knowledge allows compiler 200 to vectorize the loop in function func1( ), because it can determine that parallelism will not cause incorrect operation. In this case, the loop in func1( ) would call foo1( ) once for each element in the vector being processed.

If function foo1( ) wrote to global "A," then compiler 200 might not vectorize the loop in func1( ), or it might use the information to vectorize only a portion of the function. In this instance, the compiler may, for example, serialize the call to function foo1( ) and the memory reference to "A," while allowing the rest of the loop to execute in a parallel manner.

Figure 4:
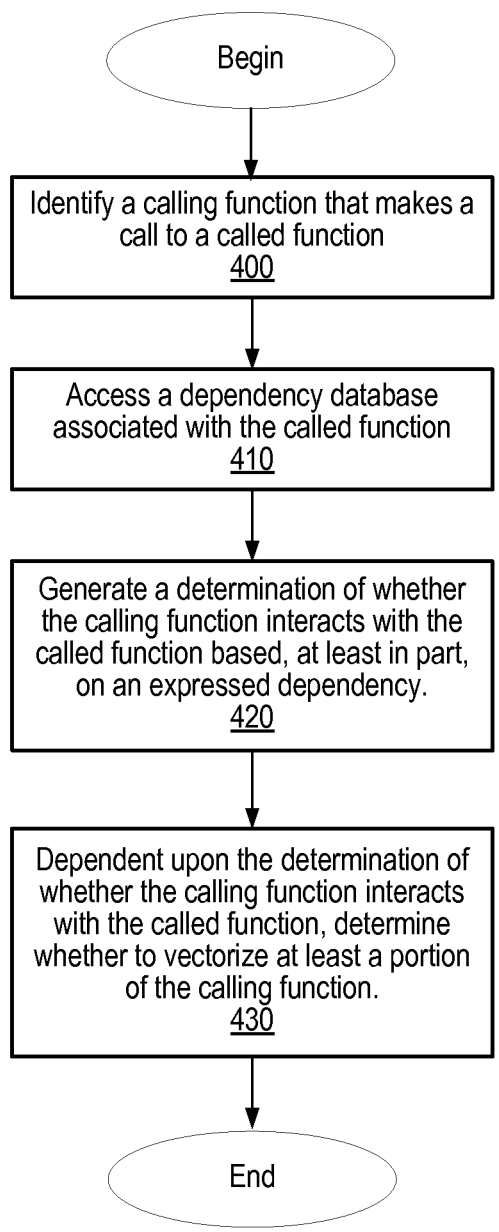
FIG. 4 shows a flow diagram illustrating a method of vectorizing a function according to certain embodiments.

Referring to FIG. 4, a flowchart representing an embodiment of a method of vectorizing a function is depicted. In block 400, compiler 200 identifies a calling function. In a non-limiting embodiment, the calling function may include a non-leaf loop, in which case the calling function may include a call to an external or called function. Referring to the code example just given, compiler 200 may process the func1.c source code and identify the func1( ) function as a calling function that includes a non-leaf for loop that calls the foo1( ) function.

In block 410, compiler 200 may attempt to access a dependency database associated with the called function. In some instances, a dependency database (e.g., a dependency file) may be explicitly indicated to compiler 200, for example via a command-line parameter, a compiler directive embedded within source code, or via another suitable technique. In other instances, compiler 200 may attempt to infer the name of a dependency file from other data according to a naming convention. For example, if a header file is included within source code, compiler 200 may search for a dependency file that is derived from the name of the header file. In some embodiments, compiler 200 may search for dependency files based on the name of the called function.

If the dependency database exists, it may indicate an expressed dependency within the called function. This expressed dependency may be, for example, a memory or data dependency associated with an data item that is not a parameter of the called function, as discussed above. In some instances, compiler 200 may check a number of different naming conventions to determine whether or not a dependency file exists.

In block 420, compiler 200 then determines whether the calling function interacts with the called function based, at least in part, on the expressed dependency (or the absence of a dependency). For example, upon accessing the dependency file associated with function foo1( ), compiler 200 may determine that foo1( ) depends on variable "e" but not variables "A" or "F." Thus, compiler 200 may determine that calling function func1( ) does interact with called function foo1( ), at least with respect to variable "e."

In block 430, dependent upon the determination of whether the calling function interacts with the called function, compiler 200 may determine whether to vectorize at least a portion of the calling function. For example, based on the expressed dependency information discussed above, compiler 200 may attempt to vectorize calling function func1( ), by generating vector code that concurrently operates on multiple data items (e.g., array elements) and/or multiple loop iterations.

In various embodiments, a dependency database may express various types of information that may be useful to compiler 200 in determining whether to vectorize a function. Examples include tracking reads and writes to data objects, pointers, pointed-to data objects, known offsets within pointed-to objects, unknown offsets into pointed-to objects (which may effectively constitute a reference to the entire object), variable offsets within objects (both pointed-to and data objects, which may enable run-time dependency analysis using the variable in question), and known offsets into objects of unknown offset into a higher-level object (e.g., when an unknown number of known offsets are referenced, but other offsets remain unreferenced).

Known offset information may enable compiler 200 to vectorize without generating additional dependency-checking instructions, while variable offset information may be used to generate dependency-checking instructions that analyze the variable dependencies at run-time, which may allow increased vector parallelism to be achieved while still maintaining program correctness.

As explained above, a dependency database may express information about a called function that is useful to compiler 200 when vectorizing a calling function. In that regard, a dependency database may store information such as the type of memory access, the addressing mode, and/or additional qualifiers.

In some embodiments, memory accesses by a function generally fall into two types: reads and writes. Thus, as shown in the examples given above, a dependency database may explicitly store indications of whether a data item is read or written.

Addressing modes describe memory accesses within a called function as viewed by the calling function. Some embodiments may define three addressing modes: constant, variable, and unknown, though alternative embodiments are possible and contemplated. Each of these three addressing modes may be determined by whether addressing can be established by the compiler at compile time, by the calling function at run time, or by the called function at run time, respectively. In addition, some embodiments may define two orthogonal qualifiers to the addressing modes: public and private. These designate whether the associated variable is visible to external modules.

According to some embodiments, constant addressing describes addressing that can be resolved from outside the module at compile time. This includes references to named variables, named structure elements within a named structure, or array indexes that can be resolved at compile time. For example, g (a named variable), str.g (a named structure element within a named structure), h[5] (an array indexed by a constant), and str[5].h (a named structure element within a named array of structures indexed by a constant) represent examples of constant addressing. These examples can represent either static or global variables. (Automatic storage is usually temporal—for example, allocated upon entry to a module and deallocated upon the module's exit—and thus not generally visible outside of the module.) The example below illustrates dependencies for a function that uses constant addressing:

```
function foo(void)
{
write public h[5];
read public g;
};
```

In some embodiments, variable addressing describes addressing that is not constant but also not modified by the called function. Therefore, it may be evaluated by the calling function at run time. Examples include references to pointed-to objects and to arrays where the addressing may be observed by the calling function. Consider the function below:

```
static int A[1000]; // file-static variable, not
exported
void assignA(int g, int x)
{
A[g] = A[x];
};
```

This function would export the following dependencies to the dependency file, declaring that the function writes A[g] and reads A[x]—both variably-addressed arrays:

```
void assignA(g,x)
{
write private A[g];
read private A[x];
};
```

In this example, dependency checking (which may also be referred to as hazard checking) may be unnecessary if the function assignA( ) is called only once per iteration of the calling loop. The called function assignA( ) may determine whether g and x overlap and may partition the vector accordingly, for example, using Macroscalar techniques.

Consider the situation where an external loop invokes assignA( ) twice per iteration:

```
for (x=...)
{
assignA (g1,x);
assignA (g2,y);
}
```

Although hazards may exist between g1 versus x, or g2 versus y, these dependencies are pertinent to a single invocation of the function. In this particular instance, the calling loop may check for potential hazards only between g1 versus y, and g2 versus x, which it can recognize from the information in the dependency file.

In some embodiments, unknown addressing is similar to variable addressing as described above, but typically applies to situations where the run-time addressing cannot be evaluated by the calling function. This may happen, for example, in situations where the called function modifies the values of address variables in a manner that is not visible to the calling function using information from the dependency file.

Additional qualifiers "public" and "private" may designate whether a linker exports a symbol to allow the variable to be inspected by calling functions. For example, the references to A[ ] in the next to last example given above are designated "private," because A[ ] is declared as a file-static variable not exported to functions that call assignA( ). In this example, compiler 200 can determine from the dependency information how the assignA( ) function addresses A[ ], but may not be able to generate code that actually reads values of A[ ].

Full-Function Vectorization

As described in detail above, compiler auto-vectorization may be employed to generate vectorized code from nonvectorized source code in a manner that may be transparent to programmers or other users. Such compiler auto-vectorization may enable source code to take advantage of performance improvements offered by vector computing hardware with little or no programmer intervention.

However, if non-leaf functions (i.e., functions that call other functions) are to be effectively vectorized, it may be desirable to provide versions of called functions that expose a vector interface to the calling function, rather than the scalar interface that might be represented in the original source code.

Moreover, an application developer might wish to target an application to a variety of computing platforms, not all of which may offer vector resources. For example, a mobile version of a processor family might omit vector operations to reduce die size and power consumption, whereas a desktop version of the same processor family might be developed to emphasize processing power over power consumption. In this scenario, in order to execute on the mobile processor, an application might need to be compiled using only scalar functions, whereas the application might use either scalar or vector functions when executing on the desktop processor. However, as with the auto-vectorization described above, it may be desirable to allow the application to efficiently execute on vector and non-vector platforms while reducing or eliminating programmer intervention.

Correspondingly, when vectorizing a function, a compiler according to some embodiments described herein may generate both scalar and vector versions of the function from a single source code description. The function may be, for example, a library function, though more generally, it may correspond to any callable procedure or method. In some embodiments, the scalar version of the function may use a scalar interface as originally specified by the source code. Meanwhile, the vector version of the function may implement a vector interface to the function, accepting vector parameters and/or generating vector return values. By generating both scalar and vector versions of the function, the compiler may enable code to be more flexibly tailored to the available resources, either at compile or run time. Moreover, by generating a vectorized version of a called function and exposing the resulting vector interface to calling functions, the compiler may facilitate the vectorization of calling functions, thus propagating opportunities for vectorization hierarchically upwards from leaf functions.

The vector interface may be expressed, for example, in a dependency database associated with the function, such as a dependency file. For example, consider the following function shell, in which internal details of the function have been omitted:

```
int foo(int A)
{
int B;
// function code return(B);
}
```

A scalar interface for this function may be represented (e.g., within a dependency file) as:
int foo (int A)
This representation reflects that according to this version, foo( ) takes a scalar parameter and returns a scalar result.

The same function, when vectorized to perform operations on multiple data items at a time, for example, may become:

```
Vector foo(Vector A)
{
Vector B;
// function code return(B);
}
```

As such, a vector interface for this function may be represented (e.g., within a dependency file) as:
Vector foo(Vector A)
Unlike the prior representation, this representation indicates that this version of foo( ) takes a vector parameter and returns a vector result.

Figure 5:
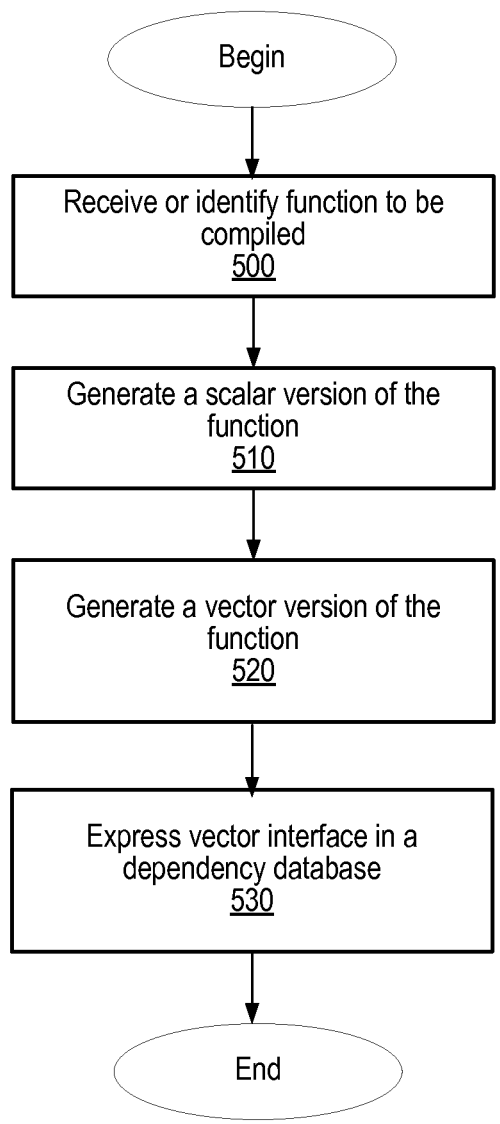
FIG. 5 shows a flow diagram illustrating a full function vectorization method according to certain embodiments.

Referring to FIG. 5, a flowchart representing an embodiment of a full-function vectorization method is depicted. In block 500, compiler 200 receives a function to be compiled. In block 510, compiler 200 may compile a scalar version of the function. In block 520, compiler 200 may compile a vector version of the function. And in block 530, compiler 200 may express a vector interface associated with the vector version of the function in a dependency database.

The presence of this alternate vector interface allows compiler 200 to make vector function calls from within vectorized loops, rather than making multiple serialized scalar function-calls from within a vectorized loop. For example, consider the following loop within a calling function that makes a call to external function foo( ):

```
for(x=0; x<512; ++x)
{
    C[x]=D[x];
    foo (C);
}
```

If foo( ) had only a scalar interface, the opportunities for vectorizing this loop might be limited, e.g., to vectorization of the assignment. However, the presence of a vector version of foo( ) may increase opportunities for loop vectorization. For example, a vectorized version of the above loop might call foo( ) using vector parameters and might receive vector results, enabling more concurrent execution and reducing serialization within the loop. Furthermore, unlike previous approaches, this technology permits the vectorization of functions that do not contain loops. This may increase the amount of overall vectorization in applications.

Loops in both versions of a function may be vectorized. Generally speaking, "horizontal" vectorization may refer to a type of vectorization in which iterations of a loop are mapped to corresponding elements of a vector. "Vertical" vectorization may refer to a type of vectorization in which the iterative nature of a loop may be preserved (i.e., as opposed to being mapped to vector elements as in horizontal vectorization), but in which scalar variables are replaced with vector variables, such that each iteration concurrently operates on more data than the scalar version of the code.

Loops in the scalar version of the function can be vectorized horizontally using Macroscalar techniques, while loops in the vector version of the function can be vectorized either horizontally or vertically. This may increase the opportunities for vectorization in applications. In addition to the performance and efficiency benefits of vectorizing function calls, this technology may increase the number of loops that are vertically vectorized in an application, thus reducing the overhead caused when loops are horizontally vectorized.

Figure 6:
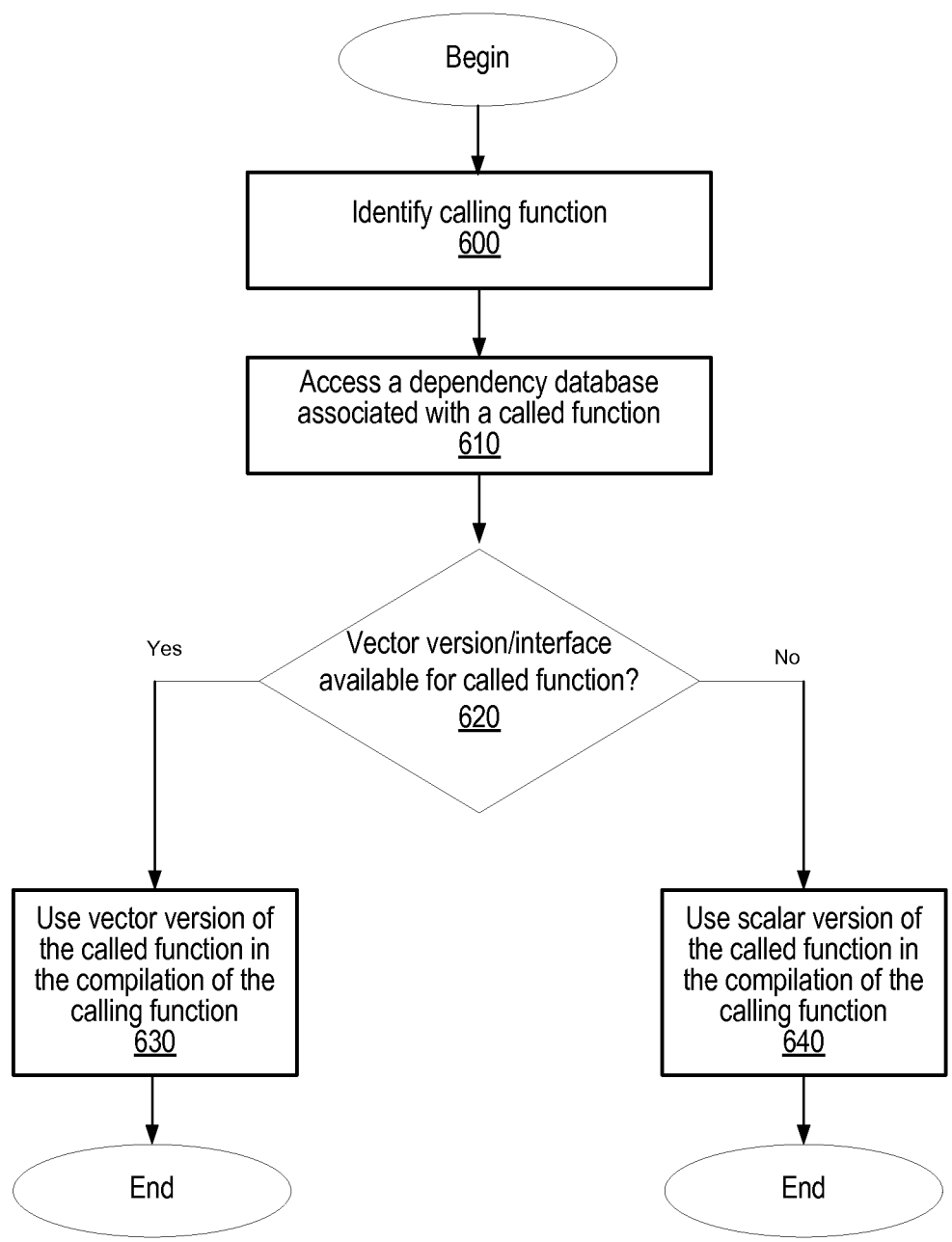
FIG. 6 shows a flow diagram illustrating a method of using a vectorized function according to certain embodiments.

Referring to FIG. 6, a flowchart representing an embodiment of a method of using a vectorized function is depicted. In block 600, compiler 200 identifies a calling function that makes a call to called function. For example, the calling function may include a loop that makes the call to a function within a pre-compiled library. In block 610, compiler 200 accesses a dependency database associated with the called function. In block 620, compiler 200 checks the dependency database to determine whether a vector variant of the called function is available. In one implementation, when the vector version is available, compiler 200 compiles the calling function to utilize the vector variant of the called function in block 630. If the vector version is not available, compiler 200 compiles the calling function to utilize the scalar version (e.g., by iteratively calling the scalar version of the function).

For example, consider again the following loop:

```
for(x=0; x<512; ++x)
{
    C[x]=D[x];
    foo (C);
}
```

When this loop is vectorized, the compiler may check a dependency database associated with foo( ) to determine whether a vector interface associated with foo( ) exists. If foo( )'s vector interface does not exist, then compiler 200 may only partially vectorize the loop, for example by vectorizing the assignment while leaving the function call in a scalar format.

If, on the other hand, foo( ) has a vectorized interface expressed in its dependency database, then in some instances, compiler 200 may vectorize the loop in its entirety (e.g., by replacing or otherwise transforming both the assignment and the function call into vector operations).

When the compiler checks foo( )'s dependency database to determine whether a vectorized interface exists for the called function, the compiler may additionally or alternatively examine any memory dependencies associated with the called function that may be expressed the same (or another) dependency database associated with foo( ).

In some implementations, addressing for each dimension of an array may be tracked independently to minimize uncertainty. This concept may apply to all aggregate data types in general, such as structures and arrays. The following example illustrates in greater detail how a compiler, such as compiler 200, for example, may use dependency database information to enable vectorization, and may employ vector versions of functions in place of scalar versions when possible (it being noted that in other embodiments, a dependency database may be used independently of determining whether vector function interfaces exist, and vice versa).

```
typedef struct
{
int a;
int b;
int c;
int *ptr;
} myStruct;
myStruct g;
int bar (myStruct &p, int j)
{
p.ptr[p.b+j] = 0;
return(p.b > j);
}
void foo(int i)
{
for (int x=i; x<i+200; ++x)
if (bar(g,x));
++g.a;
}
```

In this example, function bar( ) would export dependencies (e.g., via a dependency file generated by compiler 200 when function bar( ) is compiled, as discussed above) indicating that it writes to p.ptr[ ], and reads from p.b and j:

```
typedef struct
{
int a;
int b;
int c;
int *ptr;
} myStruct;
int bar(myStruct *p, int j)
{
read p.b;
read p.ptr;
write p.ptr[p.b+j];
};
```

It should be noted that, in this particular case, it may be unnecessary to identify references to parameters as "public" or "private." Also, it may be unnecessary to declare that the function reads from p or j, since at least in this example it can be assumed that a function uses its own parameters. The type definition of myStruct can be included in the dependency database to expose it to functions that call foo( ), but may not necessarily be exposed to the definition of myStruct through header file inclusion.

During compilation, compiler 200 may compile function bar( ) without vectorizing it because there is no loop over which to vectorize. In doing so, it may produce a scalar version of bar( ) having the following interface:

int bar(myStruct *p, int j)

In this example, bar( ) may take a single instance of a pointer to a structure and a single integer as parameters, and return a single integer as a result. Thus, this version of bar( ) is scalar in its inputs and outputs.

However, compiler 200 may also compile a vector function, with the following interface that can also be exported in the dependency database:

Vector bar(Vector p, Vector j, Vector pred)

In this example, the predicate vector pred designates which vector elements should be processed by this function. For example, assuming that vectors include a defined number of elements, a predicate vector may contain a vector having the same defined number of bits, each bit corresponding to a respective element. Each bit may serve as a Boolean predicate that determines whether its corresponding vector element should be processed (e.g., "yes" if the predicate bit is "1" and "no" if it is "0," or vice versa). Predicates allow the calling function to make conditional function calls and takes care of the tail of the loop if it does not terminate on a vector-length boundary. It is noted that other embodiments may employ different types of predicate formats, such as non-Boolean predicates.

Also, in this example, vector p is a vector of pointers to structures, although in this example they all point to the same instance. Vector j is a vector of simple integers. The compiler can infer this type information from the scalar function declaration.

One possible vector variant of function bar( ) calculates p.b+j for each element of the input vectors, and writes these results into the appropriate array indexes of p.ptr. It also returns a vector of results based on the comparison of p.b and j. In this particular example, the compiler vertically vectorized the function. That is, because bar( ) contains no loop, there are no loop iterations to be transformed into vector elements, as would be the case in horizontal vectorization. Instead, the vectorized version of bar( ) may concurrently operate on different elements of the vector inputs.

During the compilation of foo( ), compiler 200 may read the dependency information about the function bar( ), which may not necessarily be located in the same source file, and determine that called function bar( ) has no dependencies on g.a, even though the calling function is passing a pointer to the structure g. Because it has this information, compiler 200 can horizontally vectorize the loop in function foo( ). Furthermore, compiler 200 can make a single function call to the vector variant of bar( ) for each vector processed, rather than calling the scalar variant in every iteration of the loop. Finally, compiler 200 may create a vector variant of foo( ) with a vector interface. In this particular case vertical vectorization may not be applied since the full extent of x cannot be analyzed for dependencies. Horizontal vectorization of the loop may be applied, and it is contained within another loop that iterates over the vector elements that were passed to the vector variant of function foo( ).

Under these assumptions, function foo( ) might export the following dependencies:

```
void foo(int j)
{
readwrite public g.a;
```

```
read public g.b;
read public g.ptr;
write public g.ptr[@];
};
```

(The @ symbol represents unknown addressing.) Because function bar( ) exported the dependency "write p.ptr[p.b+j]," compiler 200 could tell that structure member ptr[ ] is written to as a function of x. Thus, compiler 200 may report to callers of foo( ) that the index that is written to is unknown, since it cannot be determined by callers of foo( ).

Additional Implementation Techniques

This section describes additional non-limiting compiler techniques that may be used to implement non-leaf and full-function vectorization. The description below is based on Macroscalar compiler technology, but a person of ordinary skill in the art will recognize in light of this disclosure that other compiler technologies may be used.

The previous example illustrated that addressing can include mathematical expressions. This is generally true as long as the expression does not involve a function call, and contains only terms that are visible to the calling function. This can include indirect addressing, such as when look-up tables are used in the calculation of indexes into other arrays.

Indirect addressing is one situation where configuring the compiler and linker to export static arrays as public can help vectorize more loops. Consider the following example:

```
int foo(int i)
{
static int A[100] = {...};
return(B[A[i]]);
}
void bar(void)
{
for (x=0; x<100; ++x)
{
t = B[x];
B[t] = foo(x);
}
}
```

The dependencies generated for foo( ) may differ depending on whether the compiler and linker are configured to export static symbols publicly. In the examples that follow, the first dependency file expresses private static variables and the second dependency file expresses public static variables:

```
int foo(int i)
{
read private A[i];
read public B[@];
};
int foo(int i)
{
static int A[100];
read public A[i];
read public B[A[x]];
};
```

Note that the type declaration of A may be necessary in the dependency file when it is exported publicly. When static variables are private, the addressing of B[ ] is unknown, since it cannot be determined from outside the function. Since hazard checking is not possible the vectorization of the loop in bar( ) may not be performed. When the tools are configured to export static variables publicly, however, the compiler can emit instructions that read the contents of A[x], and check for hazards between B[A[x]] and B[x], thus enabling vectorization of the loop.

Naturally, when static variables are publicly exported and addressed externally, the opportunity for name conflicts arise. To help avoid such conflicts, static variables can be name-mangled with the function and file in which they are declared.

Some hazards involve memory operations that occur conditionally, or involve addressing that may differ based upon conditional calculations. To support the vectorization of loops that call functions involving conditional dependencies, a mechanism may be provided to express how the condition affects the dependencies.

For example, consider the following code:
if (A[x]<c)d=B[x];
This code may be expressed in a dependency database as:

```
read public A[x];
read public c;
A[x] < c ? read public B[x];
A[x] < c ? write public d;
```

Conditional expressions may also exist in the calculation of the address. For example, consider the following code:

```
if (A[x] < c)
d = B[x];
else
e = B[x+c];
```

This code may be expressed in a dependency database as:

```
read public A[x];
read public c;
A[x] < c ? write public d : write public e;
A[x] < c ? read public B[x] : read public B[x+c];
```

Alternatively, the latter conditional expression above may be expressed as:
read public B[A[x]<c?x:x+c];
In some cases, unknowns may creep into the dependency expression. In this case, one illustrative example may be:
A[x]<c?read public B[x]:read public B[@];
This expression may inform the compiler about a specific dependency on B if the condition is true and an unknown dependency on B when the condition is false.

Unknowns that creep into the conditional expression may cause unconditional dependencies that behave as if the condition is both true and false. For example:
A[x]<B[@]?read public f:read public g;
May be expressed as:

```
read public f;
read public g;
```

And:
read public A[x>@?x:x+y];
May be expressed as:

```
read public A[x];
read public A[x+y];
```

Because calling functions are typically unable to evaluate unknown conditions, they may make the conservative assumption that both possible indexes into A[ ] are accessed.

In some implementations, circular dependencies may also be expressed in a dependency database. For example, consider the function below:

if (A[x]>b)b=A[x]

In one implementation, this function may be expressed as:

```
read public A[x];
read public b;
A[x] > b ? write public b;
```

Where pointers or references are passed to a function (also referred to as "passing by reference"), it is possible for the function to modify its calling parameters. This differs from modifications of parameters passed by value, for example, because modifications of parameters passed by reference may affect the operation of the calling function. Modifications of parameters passed by reference may be recorded in the same manner that modifications of static and global storage are recorded. Modifications of parameters passed by value may be treated as modifications of local automatic storage. In some instances, they may not be recorded because they are invisible to the calling function.

In some implementations, functions that meet a set of criteria may be called speculatively in cases where software speculation would be necessary to vectorize the calling loop. Accordingly, speculation-safe indicators may be expressed in the dependency file and may serve as indications that the corresponding code may be safely called in a speculative manner. In one non-limiting example, vector functions that are capable of being called speculatively may fall into one of two categories: type-A and type-B. Type-A functions may be vector-functions having the normal vector interface described herein. For instance, type-A functions may be called speculatively with no harmful side effects if they meet the following criteria. First, the function accesses no memory other than local automatic non-array storage. Second, the function does not call any other functions that are not also type-A functions. Examples of type-A functions might be transcendentals or other iterative convergence algorithms.

In addition to any return values specified by the source code, type-B functions may return a predicate vector that indicates which elements were processed. In an embodiment, the criteria for speculatively calling type-B functions may be as follows. First, any reads from non-local storage or local array storage use first-faulting read instructions. Second, the function does not write to non-local storage or static local storage. Third, the function does not call any functions that are not also type-A or type-B functions.

Calling a type-A function from a loop may be similar to calling a non-speculative function. Typically, no special action is necessary on the part of the calling loop when speculatively calling a type-A function. Calling a type-B function, however, may require the calling loop to check the return vector in order to determine which elements were processed, and adjust the behavior of the calling loop in response.

A compiler such as compiler 200 may choose to have all callers of type-B vector functions adjust their behavior to accommodate the number of elements that were actually processed, regardless of whether software speculation is used in the calling loop. Alternatively, compiler 200 may create two vector-functions for each type-B function; one speculative and one non-speculative. The criterion for type-B loops can be generally designed to ensure that those loops that qualify are few and small, and thus the code-size impact for this approach may be negligible.

Type-A and type-B vector functions may be identified by their declaration in the dependency database, as shown below. In one implementation, the absence of a designator implies the function may not be called speculatively.

```
int func1(int a) : A
{
read public b; // local-static
write public c; // local-static
};
int func2(int a) : B
{
read public d; // non-local
};
```

Aliasing can sometimes be a problem for vectorizing compilers. While Macroscalar architecture addresses the problem through run-time alias analysis, there is an overhead to this approach. Overhead in Macroscalar programs contributes to the serial component in Amdahl's law, which can limit the benefits of wider vectors. Moreover, aliasing with external or static variables can affect behavior across function calls. Therefore, in one implementation, compile-time alias analysis is performed and an aliasing indicator is exported to a dependency file.

For instance, one approach may be to separate aliasing events into two categories such as, for example, inbound and outbound aliasing. From the perspective of the called function, inbound aliasing may refer to addresses that come into a function, such as those passed-in as parameters, read from external variables, or calculated by the function by taking the address of an external variable. Meanwhile, outbound aliasing may refer to pointers that the function puts out. These can be return values—i.e., values that the function writes into external variables or de-referenced pointers.

Further, at least two types of aliasing can be tracked. "Copies aliasing" may indicate that the pointer may be a copy of another pointer and might alias anything the pointer can alias. "Points aliasing" may indicate that a pointer is likely to affect another variable. Alias information in the dependency file is an affirmative expression of the possible existence of an alias. It need not be used, for example, when the compiler simply cannot tell whether two pointers reference the same memory due to lack of information.

The declaration of aliasing for variables may be similar to the declaration of aliasing for return values. For example, consider the function below:

```
static int s;
static void *ptr, *ptr2;
static void *A[1000];
void foo(int x, int y)
{
A[x] = (void*) s;
A[y] = (void*) &s;
ptr1 = &A[s];
ptr2 = A[s];
}
```

In one implementation, this function may express the following dependencies:

```
void foo(int x, int y)
{
read public s;
```

```
write public A[x] copies s;
write public A[y] points s;
write public ptr1 points A[s];
read public A[s];
write public ptr2 copies A[s];
};
```

The foregoing distinguishes between points and copies for clarity, although it may be possible to combine these two concepts in an alternate syntax. As with other dependency information, aliasing information typically propagates upward through the chain of calling functions.

The values returned by a function may also result in aliasing, for example, through the return value itself, or through information returned by modifying passed-by-reference variables. These can also be tracked in the dependency file. For example, consider the function below:

```
static float gVar;
int *foo(float *ptr1, float **ptr2)
{
*ptr2 = &gVar;
return((int*)ptr1);
}
```

In one implementation, this function may export the following dependencies:

```
int *foo(float *ptr1, float **ptr2)
{
write *ptr2 points gVar;
return copies ptr1;
};
```

The dependency declaration may inform the calling loop that the pointer returned by foo( ) might be a copy of the pointer that was passed in. This allows the calling loop to take measures to ensure correct operation of the loop regardless of the aliasing that occurs. Furthermore, this knowledge can also enable the compiler to better leverage ANSI aliasing rules when faced with code that is no ANSI-C compliant.

As another consideration, the casting of pointers may affect address calculations. For example, consider the function below:

```
void ZeroInt(char *ptr, int x)
{
*((int*)ptr + x) = 0;
return;
}
```

In one implementation, this function may export the following dependencies:

```
void ZeroInt(char *ptr, int x)
{
write *((int*)ptr+x);
}
```

Calls via function pointers may not ordinarily be vectorized due to the fact that it is unknown at compile-time what function will be called or whether the called function supports a vector interface. Functions that call other functions via pointers may not export dependency information, which can be a reflection on the uncertainty of the dependencies on the pointed-to function. This may cause the compiler to view such functions as scalar functions with unknown dependencies.

In one implementation, a versioning scheme allows dependencies to be expressed using best practices at any point in time. For example, an embodiment may permit backward compatibility with dependency-files generated by older compilers, whereas another embodiment may permit bi-directional compatibility that enables older compilers to also read files generated by newer compilers. In cases where backward compatibility is the only requirement, then a version designator for the dependency file is used to inform older compilers that a given file is unreadable and should be ignored.

Bi-directional compatibility may be implemented as follows. Assume, for example, that compiler version 1 does not support calculations in array indices but complier version 2 does. A write to B[x+y], may be expressed by a version-1 compiler as:

```
#1 int foo(int x, int y)
{
write public B[@];
};
```

On the other hand, a version-2 compiler may additionally export the same function using a version-2 syntax:

```
#2 int foo(int x, int y)
{
write public B[x+y];
};
```

With this approach, not only can a version-2 compiler read version-1 files, but it can also allow version-2 declarations to override version-1 declarations. A version-1 compiler would know to ignore any declarations that were greater than version-1, giving it as much dependency information as it is capable of understanding. This is a significant capability as compiler technology matures.

Generally speaking, if developers are required to make changes to software to enable vectorization, then relatively little code may become vectorized. To address this problem, the techniques described herein provide the ability to perform large-scale vectorization without requiring developers to modify their source code.

Although the embodiments above have been described in considerable detail, numerous variations and modifications will become apparent to those skilled in the art once the specification is fully appreciated. It is intended that the following claims be interpreted to embrace all such variations and modifications.

What is claimed is:

1. A system comprising:
   one or more memories that, during operation, store instructions; and
   one or more processors that, during operation, retrieve instructions from the one or more memories and execute the instructions to cause the system to perform operations comprising:
     compiling a scalar version of a called function from a single source code description of the called function;
     compiling a vector version of the called function from the single source code description of the called function;
     generating a persistent dependency database associated with the called function, wherein the persistent dependency database stores an indication of a vector interface associated with the vector version of the called function, and wherein the indication is stored in the persistent dependency database prior to beginning compilation of source code including a calling function that calls the called function;

identifying a call to the scalar version of the called function within the source code that includes the calling function, the identifying occurring subsequent to beginning compilation of the source code including the calling function;

in response to identifying the call, accessing the persistent dependency database; and compiling the calling function to utilize the vector version instead of the scalar version of the called function in response to the detecting the indication of the vector interface stored in the persistent dependency database.

2. The system of claim 1, the operations further comprising:

identifying, within the called function, an expressed dependency of the called function on a variable, wherein the expressed dependency indicates that the function only reads a data item, only writes the data item, or both reads and writes the data item; and storing an indication of the expressed dependency in the persistent dependency database.

3. The system of claim 2, wherein compiling the calling function further comprises:

generating a determination of whether the calling function interacts with the called function based, at least in part, upon the expressed dependency; and vectorizing the calling function based at least in part on the determination.

4. The system of claim 1, wherein the indication of the vector interface indicates that the called function accepts one or more vector parameters or returns a vector result.

5. A non-transitory computer-readable storage medium having program instructions stored therein that, in response to execution by a computer system, cause the computer system to perform operations comprising:

identifying a calling function during a process of compiling source code including the calling function, the calling function including a call to a called function using a scalar interface;

accessing a persistent dependency database to retrieve information associated with the called function, wherein the persistent dependency database persistently stores the information such that the information is accessible across distinct compiler invocations for different functions, and wherein the information retrieved from the persistent dependency database is already stored within the persistent dependency database prior to beginning compilation of the source code including the calling function; and compiling the calling function to utilize a vector interface of the called function instead of a scalar interface of the called function in response to the persistent dependency database indicating that the called function exposes the vector interface.

6. The non-transitory computer-readable storage medium of claim 5, wherein compiling the calling function to utilize the vector interface comprises transforming the call within the calling function into a call to a vector version of the called function.

7. The non-transitory computer-readable storage medium of claim 5, the operations further comprising:

compiling the calling function to utilize a scalar interface of the called function in response to the persistent dependency database not indicating that the called function exposes the vector interface.

8. The non-transitory computer-readable storage medium of claim 5, the operations further comprising:

generating a determination of whether the persistent dependency database indicates an expressed dependency within the called function, wherein the expressed dependency indicates that the function only reads a data item, only writes the data item, or both reads and writes the data item.

9. The non-transitory computer-readable storage medium of claim 8, the operations further comprising:

vectorizing the calling function based at least in part on the determination.

10. A non-transitory computer-readable storage medium having program instructions stored therein that, in response to execution by a computer system, cause the computer system to perform operations including:

receiving a called function to be compiled;

generating a vector interface for the called function; and storing an indication of the vector interface in a persistent dependency database associated with the function, wherein the persistent dependency database persistently stores information that is accessible across distinct compiler invocations for different functions, and wherein said storing occurs prior to beginning compilation of source code that includes a calling function that calls the called function.

11. The non-transitory computer-readable storage medium of claim 10, wherein the operations further include creating the persistent dependency database at compile time of the function.

12. The non-transitory computer-readable storage medium of claim 10, wherein storing the indication of the vector interface comprises storing identifiers of one or more vector parameters accepted by the called function or one or more vector results returned by the called function.

13. The non-transitory computer-readable storage medium of claim 10, wherein the operations further include storing an indication of a scalar interface of the called function in the persistent dependency database, such that the persistent dependency database indicates both scalar and vector interfaces for the called function.

14. A method, comprising:

performing, by one or more computers:

identifying a calling function during a process of compiling source code including the calling function, the calling function including a loop that includes a call to a called function;

accessing a persistent dependency database to retrieve information associated with the called function, wherein the persistent dependency database persistently stores the information such that the information is accessible across distinct compiler invocations for different functions, and wherein the information retrieved from the persistent dependency database is already stored within the persistent dependency database prior to beginning compilation of the source code including the calling function; and vectorizing the loop of the calling function, wherein vectorizing includes:

in response to determining from the persistent dependency database that the called function exposes a vector interface, compiling the calling function to utilize the vector interface, such that within the vectorized loop, one or more calls are made to the called function via the vector interface.

15. The method of claim 14, wherein vectorizing further includes:

in response to determining from the persistent dependency database that the called function does not expose a vector interface, compiling the calling function to use a scalar interface of the called function, such that within the vectorized loop, multiple calls are made to the called function via the scalar interface.

16. The method of claim 14, wherein accessing the persistent dependency database comprises retrieving an indication of the vector interface from the persistent dependency database.

17. The method of claim 14, wherein the performing by one or more computers further includes detecting that the persistent dependency database indicates an expressed dependency within the called function, wherein the expressed dependency indicates that the function only reads a data item, only writes the data item, or both reads and writes the data item, and wherein vectorizing the loop of the calling function is based at least in part on the expressed dependency.

18. A method, comprising:
performing, by one or more computers:
receiving a called function to be compiled;
generating a scalar version of the called function from a single source code description of the function, the scalar version having a scalar interface;
generating a vector version of the called function from the single source code description of the function, the vector version having a vector interface;
storing respective indications of the scalar interface and the vector interface in a persistent dependency database associated with the called function, wherein the respective indications are stored in the persistent dependency database prior to beginning compilation of source code including a calling function that calls the called function.

19. The method of claim 18, wherein the called function includes a loop, and wherein the performing by one or more computers further includes vectorizing the loop in both the scalar and vector versions of the called function.

20. The method of claim 19, wherein vectorizing the loop in the scalar version of the called function comprises horizontally vectorizing the loop.

21. The method of claim 19, wherein vectorizing the loop in the vector version of the called function comprises horizontally or vertically vectorizing the loop.

* * * * *